US006442311B1

(12) United States Patent
Barbarossa et al.

(10) Patent No.: US 6,442,311 B1
(45) Date of Patent: Aug. 27, 2002

(54) OPTICAL DEVICE HAVING MODIFIED TRANSMISSION CHARACTERISTICS BY LOCALIZED THERMAL TREATMENT

(75) Inventors: Giovanni Barbarossa, Tucker; Chellappan Narayanan, Alpharetta, both of GA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/350,205

(22) Filed: Jul. 9, 1999

(51) Int. Cl.⁷ .................................................. G02B 6/34

(52) U.S. Cl. ........................... 385/37; 385/129; 385/130

(58) Field of Search .............................. 385/37, 38, 129, 385/131; 219/121.6

(56) References Cited

U.S. PATENT DOCUMENTS

| | | | |
|---|---|---|---|
| 4,090,776 A | * 5/1978 | Bernal et al. | 350/96.12 |
| 4,378,490 A | 3/1983 | D'Auria Luigi | 250/201 |
| 4,978,188 A | 12/1990 | Kawachi et al. | 350/96.12 |
| 5,002,350 A | 3/1991 | Dragone | 350/96.15 |
| 5,136,671 A | 8/1992 | Dragone | 385/46 |
| 5,500,031 A | * 3/1996 | Atkins et al. | 65/386 |
| 5,506,925 A | 4/1996 | Greene et al. | 385/129 |
| 5,625,723 A | 4/1997 | Dragone et al. | 835/11 |
| 5,694,512 A | 12/1997 | Gonthier et al. | 385/140 |
| 5,745,271 A | 4/1998 | Ford et al. | |
| 5,768,452 A | * 6/1998 | Atkins et al. | 385/27 |

FOREIGN PATENT DOCUMENTS

| | | | |
|---|---|---|---|
| JP | 08184720 A | * | 7/1996 |
| WO | WO 0029881 | * | 5/2000 |

OTHER PUBLICATIONS

H. Uetsuka et al., Novel Method For Centre Wavelength Tuning Of Silica Waveguide Type Mach–Zehnder Multi/Demultiplexers, Electronics Letters, vol. 26, No. 4, pp. 251–253, Feb. 15, 1990.

Rothschild, et al., "Effects Of Excimer Laser Irradiation On The Transmission, Index Of Refraction, And Density Of Ultraviolet Grade Fused Silica," Appl. Phys. Lett. 55 (13), Sep. 25, 1989, 1276–1278.

Yamada, et al., "Statically–Phase–Compensated 10GHz–S-paced Arrayed–Waveguide Grating," Electronics Lett., Aug. 15, 1996, vol. 32, No. 17, 1580–1582.

(List continued on next page.)

*Primary Examiner*—Rodney Bovernick
*Assistant Examiner*—Sung Pak
(74) *Attorney, Agent, or Firm*—Scott J. Rittman (57) ABSTRACT

Transmission characteristics of an optical device 200, fabricated from multiple layers 16, 27, 28 of silica-based glass on a silicon substrate 26, are modified by localized thermal treatment. The beam 501 of a carbon-dioxide ($CO_2$) laser 510 is used to selectively soften the core and/or cladding material of a waveguide structure during or after the fabrication process. In one application, softening relieves the strain developed between the waveguide structure and the silicon substrate and substantially reduces or eliminates birefringence. In a second application, the $CO_2$ laser is operated at another power level in order to modify the index of refraction. Changes in the index of refraction change the speed of light through a waveguide thereby changing the phase shift associated with the waveguide. In a third application, the $CO_2$ laser is operated at yet another power level to increase the transmission loss of the waveguide. In all of the embodiments, heat treatment is substantially faster and/or less expensive than known techniques for modifying the transmission characteristics of an optical device.

7 Claims, 5 Drawing Sheets

OTHER PUBLICATIONS

Yamada, et al., "10GHz–Spaced Arrayed–Waveguide Grating Multiplexer With Phase–Error–Compensating–Thin–Film Heaters," Electronics Lett., Mar. 2, 1995, vol. 31, No. 5, 360–361.

Hibino, et al., "Increase In Photosensitivity In Silica–Based Optical Waveguides On Silicon," Elec. Lett., 1 Apr. 1993, Vol. 29, No. 7, 621–623.

Takahashi, et al., "Polarization–Insensitive Arrayed–Waveguide Wavelength Multiplexer With Birefringence Compensating Film, " IEE Photonics Tech. Lett., vol. 5, No. 6, Jun. 1993, 707–709.

Kazuriro, et al., "A Wide–Band Guided–Wave Periodic Multi/Demultiplexer with A Ring Resonator For Optical FDM Transmission Systems," Journal Of Lightwave Tech., vol. 6, No. 6, Jun. 1988, 1016–1023.

Inoue, et al., "Polarization Sensitivity Of A Silica Waveguide Thermooptic Phase Shifter For Planar Lightwave Circuits, " IEEE Photonics Tech. Lett., vol. 4, No. 1, Jan. 1992, 36–38.*

Kaminow, et al. eds., Optical Fiber Telecommunications IIB, 319–376, 1997.*

Kitawaga, et al., "Single–Frequency $Er^{3+}$–Doped Silica––Based Planar Waveguide Laser With Integrated Photo–Imprinted Bragg Reflectors," Electronics Lett., Aug. 4, 1994, vol. 30, No. 16, 1311–1312.

Hibino, et al., "Optical Frequency Tuning By Laswer Irradiation In Silica–Based Mach–Zehnder–Type Multi/Demultiplexers," IEE Photonics Tech Lett., Jul. 1991, vol. 3, No. 7, 640–642.

Kashyap, et al., "Laser–Trimmed Four–Port Bandpass Filter Fabricated In Single–Mode Photosensitive Ge–Doped Planar Waveguide," IEEE Photonics Tech. Lett., vol. 5, No. 2, Feb. 1993, 191–194.

* cited by examiner

OPTICAL DEVICE HAVING MODIFIED TRANSMISSION CHARACTERISTICS BY LOCALIZED THERMAL TREATMENT

TECHNICAL FIELD

This invention relates to optical devices and, more particularly, to a technique for modifying one or more transmission characteristics of such devices.

BACKGROUND OF THE INVENTION

Optical devices such as waveguides, gratings and switches, for example, are typically fabricated in layers of silica-based glass deposited onto a silicon substrate. The finished devices are expensive because an extremely high-precision fabrication process is involved. Moreover, even when the fabrication process is perfect, certain problems such as strain birefingence arise because the various layers have different thermal expansion coefficients, which cause large strains once the device returns to ambient temperature after undergoing annealing. It is therefore desirable to further process a fabricated optical device in order to modify one or more of its transmission characteristics (e.g., birefringence, phase shift and loss) to thereby improve yield and provide customization. is known to reduce birefingence by applying various forms of electromagnetic radiation such as ultraviolet (UV), x-ray, and even ionized particles such as proton beams. For example, Hibino et al., *Electronics Letters*, Vol. 29, No. 7 pp. 621–623 (1993) indicate that birefringence can be reduced by irradiating the waveguide structures at a wavelength which is absorbed by photosensitive defects in the core material. In particular, Hibino demonstrated that birefringence can be reduced in germanium-doped planar silica waveguides by irradiation with ultraviolet light at a wavelength of 248 nanometers (nm). This wavelength corresponds to germanium-related color center defects that are known to be present in the doped silica core material. In Hibino, the photosensitivity of the germanium core is enhanced by consolidating the core material in a reducing atmosphere. This technique is well known to facilitate the generation of germanium defects responsible for optical absorption at 248 nm. Since the cladding composition is presumably a standard phosphorous and boron-doped silica layer, the cladding is essentially transparent to light at 248 nm, with an optical absorption coefficient on the order of 0.1 $cm^{-1}$. By comparison, the optical absorption coefficient of the germanium-doped core layer is on the order of 100 $cm^{-1}$ at this wavelength. While the prior art has reduced birefringence in waveguide structures using ultraviolet (UV) radiation, these techniques have required that a specific mask be fabricated for each device and are unsatisfactory when applied to an integrated optical grating where 10–200 waveguides are involved, each separated by as little as 20 microns. In this case the waveguides cannot be selectively irradiated by masking individual ones of the waveguides. Moreover, the time required for birefringence modification is in the order of hours, which is too long for commercial application.

It is also known to cause refractive index changes by laser irradiation. Such changes may be used to modify the propagation delay (i.e., phase shift) of an optical waveguide in order to correct phase error. For example, Hibino et al., *IEEE Photonics Technology Letters*, Vol. 3, No. 7 pp. 640–642 (1991) apply an $Ar^+$ laser, operating at 480 nm, for about one hour to modify the phase characteristics of a Mach-Zehnder interferometer via two-photon absorption. In a manufacturing environment, however, it is not practical to expend this much time per device. The photosensitivity of silica materials is sometimes employed to alter the refractive index without affecting the birefringence. For example, Kitagawa et al., *Electronics Letters*, 1994, Vol. 30, No. 16 pp. 1311–1312, form optical gratings by photo-inducing (via a mask) spatially non-uniform refractive index changes at a wavelength of 193 nm. The waveguides are first loaded with molecular hydrogen to increase their photosensitivity. Other techniques for modifying the phase shift of an optical waveguide involve: (i) the use of thin-film heaters deposited on top of the waveguides to thermo-optically change the propagation constant of the waveguide (H. Yamada, *Electronics Letters*, Vol. 31, No. 5, 1995, pp. 360–361); and (ii) the use of a thin amorphous silicon film deposited on top of the waveguides to change the propagation constant of the waveguide (H. Yamada, *Electronics Letters*, Vol. 32, No. 17, 1996, pp. 1580–1582).

Additionally, it is desirable to equalize the transmission loss associated with the input and/or output ports of a optical branching device during fabrication or by post-fabrication processing rather than by the addition of discrete attenuator elements. For example, a dense wavelength-division multiplexer (DWDM) is shown in application Ser. No. 08/759, 281 using thermo-optic Mach-Zehnder interferometers as tunable attenuators. Equalization is difficult to achieve in a manufacturing environment, but it is critical to the proper operation of DWDMs and similar optical devices.

Accordingly, what is desired is a method for modifying one or more transmission characteristics of an optical device during fabrication or by post-fabrication processing rather than the addition of additional elements. Moreover it is desirable that overall processing be completed in less time than existing techniques permit.

SUMMARY OF THE INVENTION

The inventors of the present invention have discovered that by applying localized thermal treatment, of suitable intensity, that various transmission characteristics of an optical device can be modified. The optical device is fabricated from multiple layers of silica-based glass deposited onto a silicon substrate.

In an illustrative embodiment of the present invention, a carbon-dioxide ($CO_2$) laser is used to selectively soften the cladding material of a waveguide structure. Such softening relieves the strain developed between the waveguide structure and the silicon substrate and substantially reduces or eliminates birefringence.

In another illustrative embodiment of the invention, the $C_2$ laser is operated at a power level, which is suitable for changing the index of refraction the waveguide. Such modification changes the speed of light through the waveguide and, consequently, the phase shift associated with a given length of the waveguide is changed.

In yet another illustrative embodiment of the invention, the $CO_2$ laser is operated at a power level, which is suitable for increasing the transmission loss of the waveguide. This is a particularly useful application of the invention because it allows the manufacturer to equalize the power levels of the various outputs of an optical demultiplexer, for example. Such equalization is frequently handled by attaching discrete optical attenuators to each output port—a technique that is costly, cumbersome, and prone to error.

In all of the embodiments, one or more transmission characteristics of an optical device may be modified by localized thermal treatment during, or subsequent to, fabrication of the device. Such treatment is substantially faster and/or less expensive than known techniques for achieving similar results, and are particularly advantageous for correcting imperfections associated with the manufacturing process.

DETAILED DESCRIPTION

Optical multiplexers and demultiplexers are key elements in modern optical networks, and are typically fabricated by interconnecting a pair of star couplers with a grating that comprises a number of unequal-length waveguides (also known as an arrayed waveguide grating or AWG). The lengths of these waveguides are purposely made unequal so that each individual waveguide provides just the right amount of phase shift to enable accurate multiplexing (in one direction of transmission) and/or demultiplexing (in the other direction). However, certain transmission characteristics (e.g., phase shift) of the individual waveguides may need to be modified, either during or after fabrication, so that the overall optical device performs satisfactorily. The principles of the present invention are best disclosed by first discussing the fabrication of such multiplexers and demultiplexers.

Figure 1:
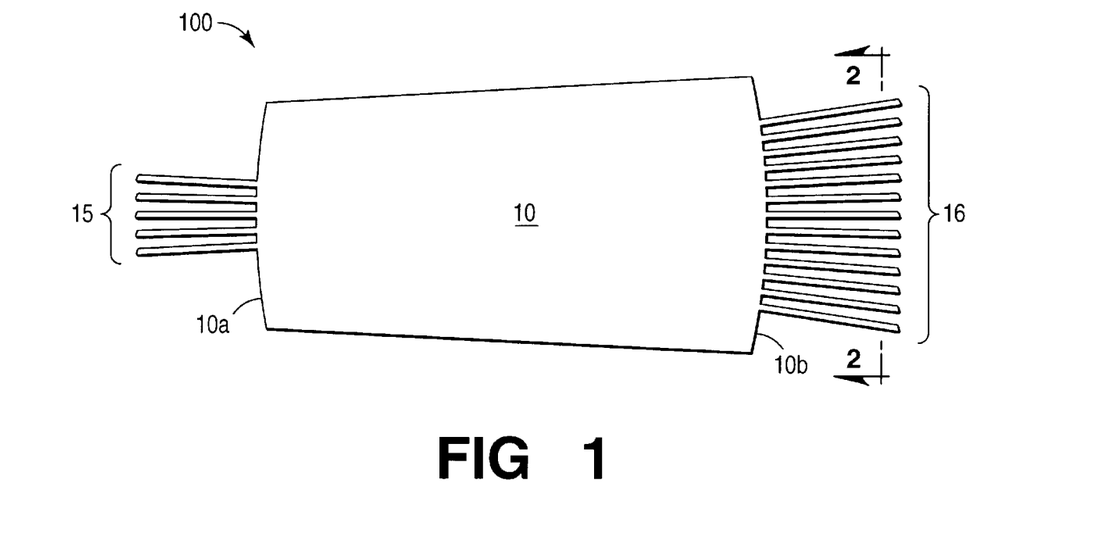
FIG. 1 discloses a star coupler having a number of input and output ports.

FIG. 1 shows a known star coupler 100, which splits the optical power entering any of its input ports among all of its output ports. Star coupler 100 includes a free-space region 10, which comprises an optical slab waveguide having two curved, preferably circular, boundaries 10a and 10b. Power transfer between an input waveguide array 15 and an output waveguide array 16 is accomplished through radiation in the slab 10. These waveguide arrays 15, 16 are radially directed toward virtual focal points and configured so that their respective foci are located a predetermined distance away from and outside the slab 10 to minimize phase errors caused by mutual coupling between adjacent waveguides. Each of these waveguide arrays is coupled to the slab 10 in a substantially uniform fashion along boundaries 10a and 10b.

Figure 2:
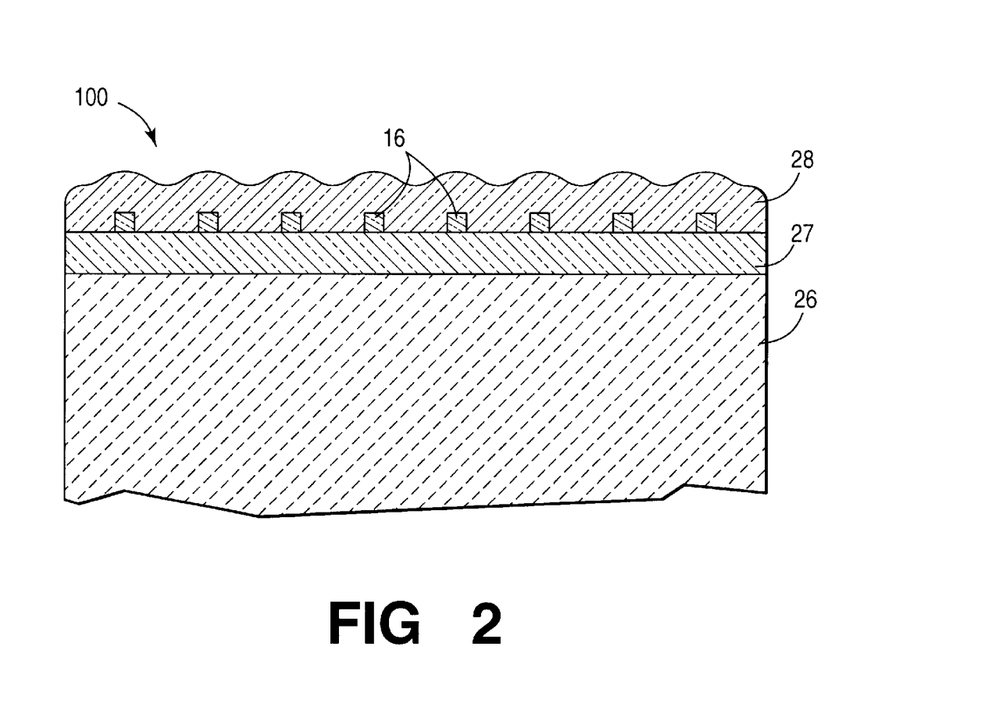
FIG. 2 discloses a cross-section view of the star coupler shown in FIG. 1 showing its output waveguides.

Referring now to FIG. 2, a cross section of star coupler 100 is shown to illustrate typical dimensions and materials in the region where waveguides 16 are present. Substrate 26 comprises silicon having a thickness of 500 $\mu$m. Cladding 27 comprises a 15 $\mu$m layer of silica having an index of refraction of about 1.445 at a wavelength ($\lambda$) of 1.55 $\mu$m. Waveguide cores 16 are generally square, they have a thickness and width of about 7 $\mu$m, and they comprise silica having an index of refraction of about 1.454 at $\lambda$=1.55 $\mu$m. The waveguide cores 16 are separated by a distance of about 2.5 $\mu$m where they are closest together at their junction with slab 10 (see FIG. 1). The fact that the core material has a higher index of refraction than the cladding material enables the core to guide lightwaves. Cladding layer 28, which is substantially the same as cladding layer 27 in refractive index, is deposited on top of cores 16 to complete the structure. Star coupler 100 is constructed using silicon optical bench (SiOB) technology, discussed below, on a silicon substrate.

The most advanced and technically developed planar waveguides are doped-silica waveguides fabricated with SiOB technology. A doped-silica waveguide is usually preferred because it has a number of attractive properties including low cost, low insertion loss, low birefringence, stability, and compatibility for coupling to fiber. Further, the processing steps are compatible with those in silicon integrated circuit (IC) technology, which are geared for mass production and are readily known.

Generally, doped-silica waveguides 15, 16 are formed by initially depositing a base or lower cladding layer 27 of low index silica on a silicon or silica substrate 26. A layer of doped silica with a high refractive index, i.e., the core layer 16, is then deposited on top of the lower cladding layer. The core layer is subsequently patterned or sculpted into structures required by the optical circuits using photo-lithographic techniques similar to those used in integrated circuit fabrication. Lastly, a top cladding layer 28 is deposited to cover the patterned waveguide core. This technology is generally described by Y. P. Li and C. H. Henry in *Silicon Optical Bench Waveguide Technology* at Chapter 8 of the text *Optical Fiber Telecommunications IIIB*. edited by Ivan P. Karninow and Thomas L. Koch, Copyright 1997 by Lucent Technologies, which is hereby incorporated by reference.

Critical to the performance of any planar optical waveguide are the waveguide dimensions, i.e., the height and width of the waveguide core, and the refractive index difference between the core and the cladding, denoted $\Delta$. The height or thickness of the core is determined by the amount of core material deposited on a carrier substrate; and the width of the core is determined by the photo-lithographic mask and undercut in chemical etching. The $\Delta$ of the waveguide is mostly determined by the material system and the fabrication process. In practice, different waveguide structures and systems are used for different types of functions and tradeoffs are made in the core dimensions and $\Delta$ to optimize different aspects of optical performance.

Birefringence

Optical devices are often required to perform in a manner that is insensitive to the polarization state of the input optical signal. Strain induced birefringence in silica waveguide devices can seriously degrade performance in this respect. For example, the difference between the two principle refractive indices in silica waveguides which is attributable to strain is typically measured to be about $3\times10^{-4}$. An optical signal propagating in a device such as a multiplexer/demultiplexer which incorporates silica waveguides experiences a wavelength dependence on polarization of about 0.3 nm, which is unacceptably large for many applications. In telecommunications wavelength-division multiplexed systems for example, a maximum polarization wavelength dependence of about 0.05 nm is required.

Figure 3:
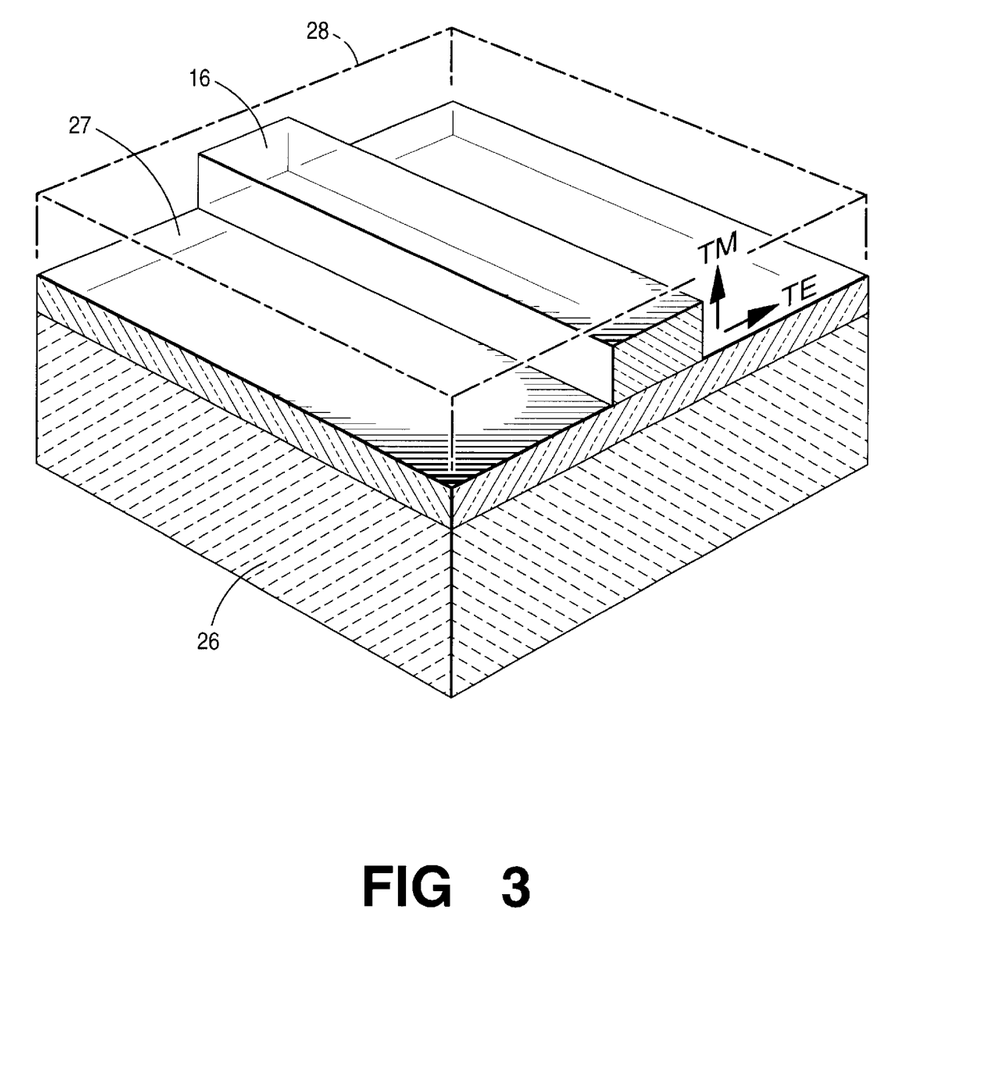
FIG. 3 shows a perspective view of an integrated waveguide formed on a substrate illustrating the transverse electric (TE) and transverse magnetic (TM) propagation modes of an optical signal.

FIG. 3 shows a perspective view of an integrated waveguide core 16 formed on a substrate 26 illustrating the transverse electric (TE) and transverse magnetic (TM) propagation modes of an optical signal. It is desirable for both polarization modes (TE, TM) to propagate through the waveguide core at the same velocity, which means that the index of refraction for the polarization modes to be identical. Birefringence is defined in terms of the principle indices of refraction $n_{TE}$ and $n_{TM}$ respectively experienced by the TE and TM modes of an optical signal. More specifically, birefringence is equal to the difference between the refractive indices and thus is zero when they are equal. While numerous factors contribute to birefringence, strain induced birefringence is believed to be the largest component in planar silica devices.

Figure 4A:
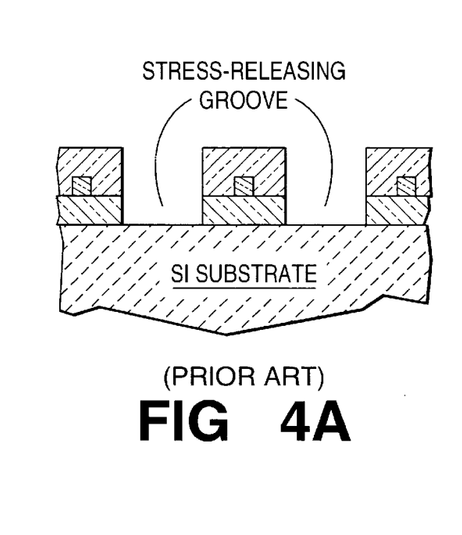
FIGS. 4A and 4B show known birefringence control techniques.
Figure 4B:
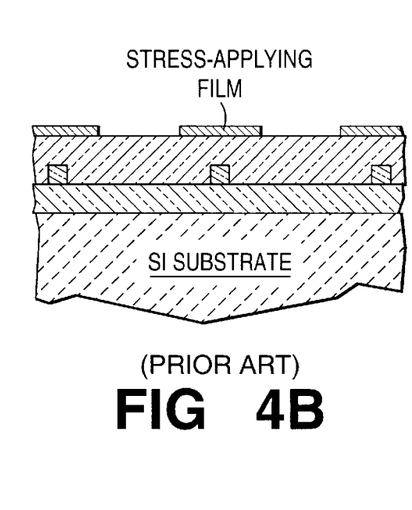

Heretofore, birefringence has been reduced by irradiating the waveguide structure at wavelengths that are absorbed by photosensitive defects in the core material as discussed in the Background of the Invention. FIG. 4A illustrates another technique for reducing stress-induced birefringence by etching grooves between waveguides; and FIG. 4B illustrates reducing stress-induced birefringence by applying a compensating stress that tends to cancel an existing stress.

Of particular interest is the reduction of birefringence in an optical grating, defined as a plurality of waveguides having unequal lengths that provide a predetermined path length difference when traversed by optical signals propagating therein. In some cases adjacent waveguides in the grating all differ in length from one another by a constant predetermined amount. The path length difference imparts a shift in the phase of the optical signals relative to one another. Optical gratings are well known in the art and shown, for example, in U.S. Pat. Nos. 5,002,350 and 5,136,671.

Compressive strains in the silica material of which the integrated optical grating is composed give rise to birefringence. Birefringence in turn gives rise to different propagation constants for the TE and TM modes of an optical wave propagating in the waveguides of the optical grating. The different propagation constants for the TE and TM modes yield a difference in the phase shift experienced by the two modes as they propagate. The relative phase shift between the two modes splits the peaks appearing in the transmission spectrum of the grating into two distinct peaks. The wavelength separation between these peaks will be referred to as the inherent polarization shift observed in the transmission spectrum.

The present invention modifies birefringence in silica-based optical waveguides by localized thermal treatment of the waveguide structure in such a manner that the strain developed between the waveguide structure and the silicon substrate is reduced or eliminated. In particular, the method utilizes a localized source of heat such as, for example, the beam of a carbon dioxide ($CO_2$) laser, to selectively soften the cladding material of the waveguide structure and release the strain developed between the waveguide structure and the silicon substrate during the annealing step of the fabrication process. A difference in the refractoriness of the core and the cladding enables localized thermal treatment of the cladding to be completed without affecting the integrity of the core of the waveguide structure. By softening a circumscribed area of the cladding of the waveguide structure, strain is selectively relieved and, consequently, birefringence is modified according to the desires of the designer.

To reduce or even eliminate the inherent polarization shift, the phase shift experienced by the TE and TM modes must be adjusted to compensate for the effects of birefringence. As discussed above, the requisite compensation can be achieved by thermally treating the waveguides to induce a compensating polarization shift that cancels the inherent polarization shift. The compensating differential phase shift introduced by localized thermal treatment is proportional to the length of waveguide treated. In a grating of unequal-length waveguides, for example, it is understood that length of waveguide that receives heat treatment is proportional to the overall length of the waveguide.

Phase Error

Optical waveguide filters are typically based on the principle of interference. An optical signal is split into two or more beams using a directional coupler or a star coupler (see FIG. 1), the phase of each beam is then altered by varying the optical path lengths, and the beams are finally recombined to obtain the required effect. At optical wavelengths, the optical path length needs to be accurately controlled to achieve low crosstalk, high isolation, and accuracy of the center wavelength of the passband. The optical path length depends of the physical path length and the propagation constant of the optical mode propagating in the waveguide. The physical path length is accurately controlled by the design of the make that is used to fabricate the device. The propagation constant of the mode in the waveguide depends on the geometrical and structural properties of the waveguide, and it is very sensitive to fabrication variations. For example, offsets from the desired value of the refractive index of the core or the cladding layer, and/or offsets of the dimensions of the optical waveguide, as well as variations, i.e., non-uniformity of the above parameters across the device, can substantially alter the phase of the propagating optical mode and lower the performance of the device. Therefore, it is desirable to have some means of compensating for the phase errors produced by the fabrication process to increase the device yield in manufacturing and, ultimately, to improve the performance achievable with the available technology.

Figure 4C:
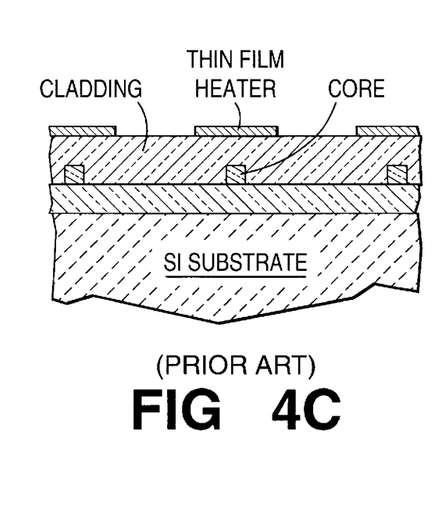
FIG. 4C shows a known, thermo-optic phase control technique.

FIG. 4C shows a known phase-control technique that employs a thin film heater mounted above the waveguide whose phase is to be modified. In particular, the heater changes the temperature of the waveguide to increase/decrease its length. As discussed above, a change in the physical path length of a waveguide also changes its phase shift. The present invention modifies phase shift in silica-based optical waveguides by localized thermal treatment of the waveguide structure in such a manner that the propagation constant of the optical mode propagating in the waveguide is changed. In particular, the method utilizes a localized source of heat such as, for example, the beam of a carbon dioxide ($CO_2$) laser to selectively soften the material of the waveguide structure in such a manner that the refractive index of the waveguide is changed. By softening a circumscribed area of the waveguide structure, the refractive index is selectively changed and, consequently, its phase shift is modified according to the desires of the designer.

Transmission Loss

Figure 4D:
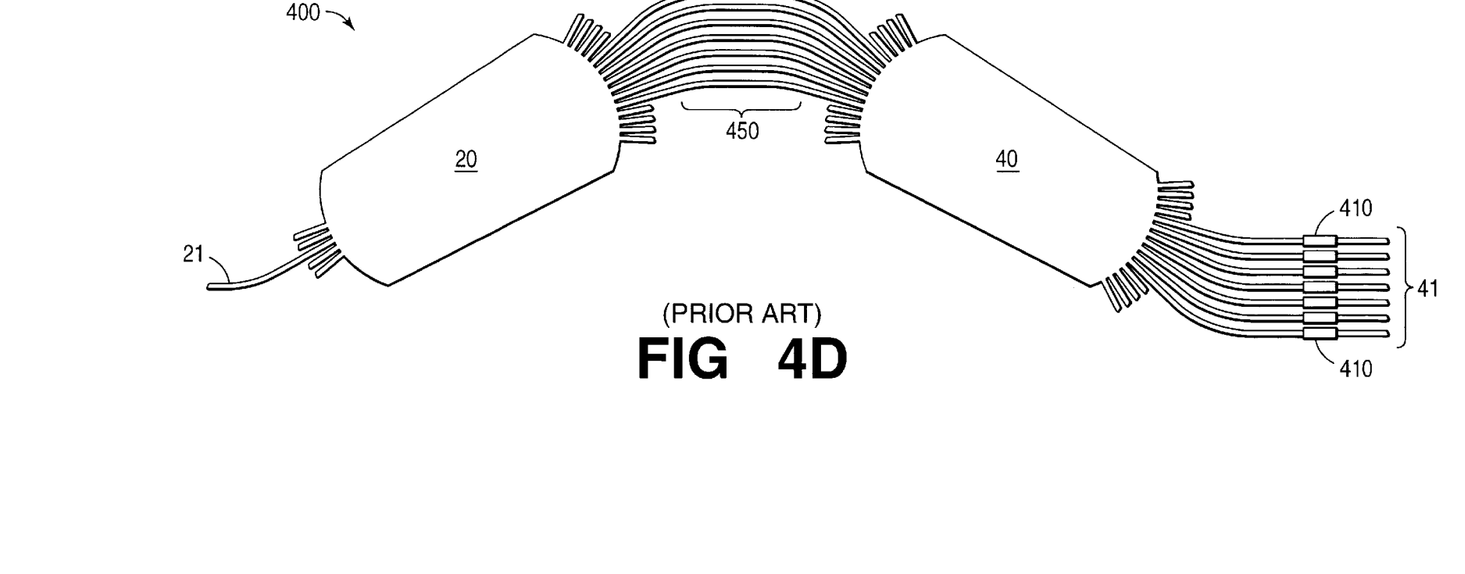
FIG. 4D shows a known technique for equalizing the power on the individual output ports of demultiplexer.

Optical transmission networks frequently include cascaded multiplexers and demultiplexers as well as optical amplifiers, and unequal power levels in the different channels results in poor signal-to-noise ratio in the low power channels. This is of particular concern because the normal operation of an AWG-type wavelength-division multiplexer, such as shown in FIG. 4D, induces loss in the outermost channels—a phenomenon commonly referred to as roll-off. In particular, FIG. 4D discloses a dense wavelength-division multiplexer (DWDM) 400 that provides a demultiplexing function in the left-to-right direction of signal propagation. A demultiplexer operates much like a prism, which takes a beam of white light at an input and separates it into its constituent colors at the output. In optical demultiplexers, however, the input light beam comprises a discrete number of colors ($\lambda_1, \lambda_2, \ldots, \lambda_n$) at an input waveguide 21, and each color is precisely directed to a particular output waveguide 41. Optical demultiplexer 400 comprises a pair of star couplers that are interconnected by a diffraction grating 450, which is made from a plurality of unequal-length optical waveguides. The length of each waveguide in the grating 450 differs from the lengths of all other waveguides by different amounts so that a common optical signal is phase shifted by different amounts when it reaches then end of the grating.

Ideally, the optical power from any input splits evenly into all the outputs without power loss, so that each output receives an equal portion of the input power. One star coupler includes a dielectric slab 20 which comprises a free-space region having two curved, preferably circular, boundaries. Power transfer through this star coupler is accomplished through radiation in the dielectric slab 20 from input waveguide 21 to the output waveguides that make up grating 450. This grating 450 is connected to another star coupler that includes dielectric slab 40. The effect of the grating and the positioning of input and output waveguides on the dielectric slab 40 causes predetermined wavelengths (colors) to be directed to specific output waveguides 41. However, the power levels of the output colors are not generally equal to each other, and correction is required. This is frequently handled by the use of attenuators 410–410 at various output ports that decrease the power level by different amounts to a predetermined level. It is known to mount such attenuators 410 on the same substrate as the demultiplexer 400; however, such attenuators require additional space and add complexity to the design (see e.g., application Ser. No. 08/759,281 which uses thermo-optic Mach-Zehnder interferometers as tunable attenuators).

Figure 5:
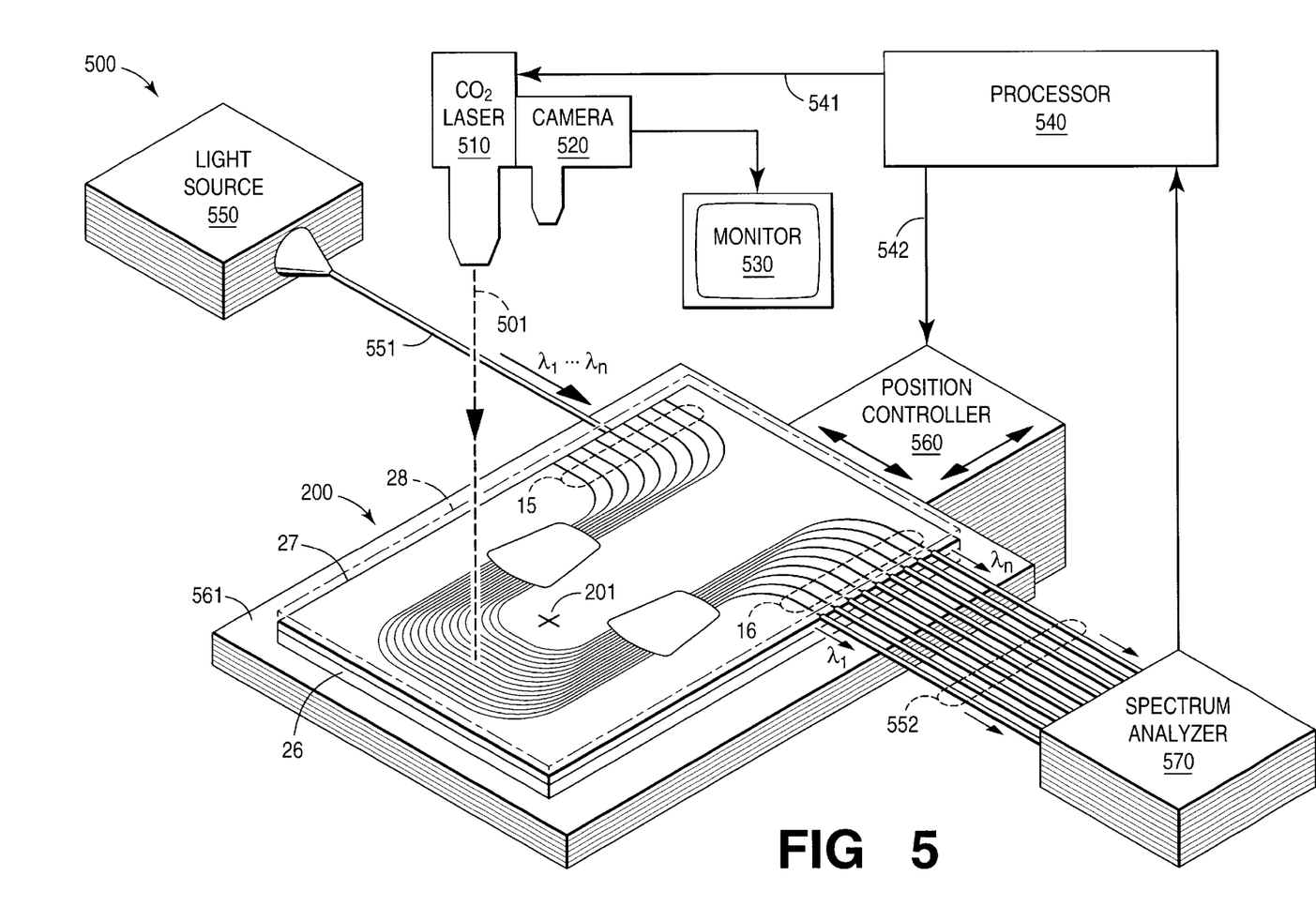
FIG. 5 discloses apparatus for providing localized thermal treatment of an optical device in accordance with the invention.

FIG. 5 discloses apparatus 500 for providing localized thermal treatment of an optical device 200 in accordance with the invention. In particular, an optical device 200 (illustratively a demultiplexer) is shown on a silicon substrate 26. The optical device 200 includes a number of waveguides that form a grating, which is being subjected to heat treatment via high-intensity laser light 501. Preferably, a $CO_2$ laser 510 is the heat source. Cladding layers 27, 28 surround the core material that makes up the optical device. Relative movement between the laser and the optical device causes a selected region to be heated; and while it is not required by the present invention, the $CO_2$ laser 510 and its laser beam 501 are held stationary while the optical device is moved in two dimensions. A suitable $CO_2$ laser is commercially available from Coherent Diamond Corporation (model number 64). The laser provides pulsed power at 1000 pulses per second, but the power can be varied by changing the duty cycle. At a 25% duty cycle, the average power is about 150 watts. The focal length of the lens is 63.5 millimeters (mm), the beam diameter is about 16 mm at the lens. Effective heating occurs with a beam diameter from about 0.5 mm to about 1.0 mm at the substrate.

The substrate 26 of the optical device 200 is mounted on a holder 561 whose position is controlled by position controller 560. Indeed, position controller 560 is responsive to control signals over path 542 from processor 540, which ultimately controls relative movement between the heat source 510 and the optical device 200. Although not shown in FIG. 5, the substrate may be maintained in a stationary position on the holder 561 by any one of a number of techniques including a mechanical clamp, a recessed region on the platform or vacuum means. Nevertheless, once positioned on the platform, an indexing mark 201 on the optical device 200 is located by camera 520 as an alignment reference for executing a predetermined thermal treatment pattern. A monitor 530 displays what camera 520 "sees" and is useful during alignment.

Figure 6A:
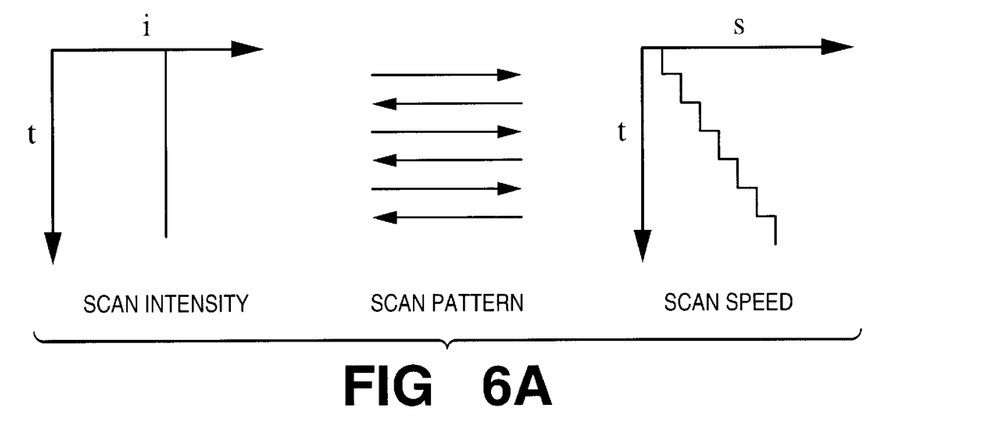
FIGS. 6A–6C discloses various scanning patterns of a localized thermal source, such as a $CO_2$ laser, which may be used in the present invention.
Figure 6B:
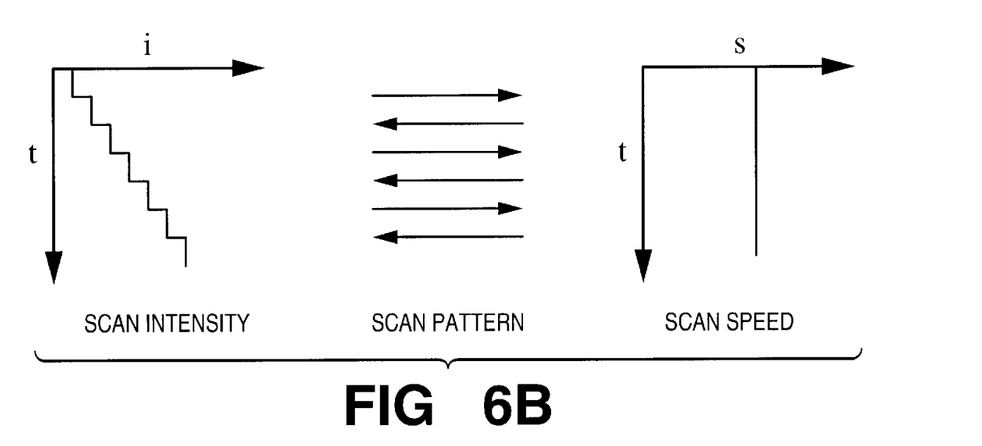
Figure 6C:
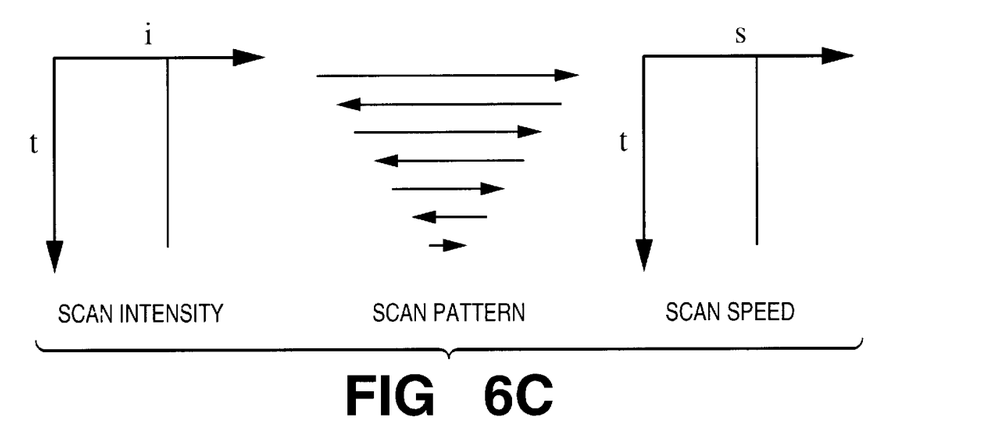

Processor 540 includes stored program information that dynamically controls the intensity of laser source 510 via control signals over path 541 and the instantaneous position of the optical device 200. Examples of different scanning patterns are shown in FIGS. 6A, 6B and 6C and will be briefly discussed later. However, each optical device 200 may need to receive a different heat treatment regime and, therefore, apparatus 500 includes equipment (540, 550, 570) for monitoring the effect of heat treatment on any particular transmission characteristic that is to be modified by heat treatment, and equipment (510, 540, 560) for controlling the heat treatment process in order to bring about the desired result. Illustratively, the optical device shown is a demultiplexer, which receives a multiplexed lightwave signal from light source 550 that provides a probe beam. The probe beam comprises a number of different colors ($\lambda_1, \lambda_2, \ldots, \lambda_n$) that are multiplexed onto a single optical fiber 551 and delivered to one of the input waveguides 15 of the demultiplexer. If the demultiplexer functions properly, then each of its output waveguides 16 will contain a single one of the input colors ($\lambda_1, \lambda_2, \ldots, \lambda_n$) at a predetermined power level. Spectrum analyzer 570 is connected to the output waveguides 16 of the optical device via optical fibers 552 to measure the spectral content and power level of each output signal. This information is then provided to the processor 540 where results are determined and, optionally, another heat treatment process is initiated. A heat treatment process involves scanning a localized region of the optical device according to a predetermined scan pattern. The amount of heat delivered to the localized region is a function of the intensity of the laser, its pulse repetition rate, and the scanning pattern.

Reference is briefly made to FIGS. 6A, 6B and 6C, which illustrate various scanning patterns of a $CO_2$ laser that can be applied to optical device 200 in order to modify one or more of its transmission characteristics by localized heat treatment. These scanning patterns are illustrative of patterns that are applied to an optical grating (such as shown in FIG. 5) that comprises a number of parallel, unequal-length waveguides. Illustratively, the scanning pattern is applied in a direction that is parallel to the longitudinal axes of the waveguides. That the heat treatment applied to the different waveguides of the grating may be different either because (i) the length of the waveguide scanned is different, or (ii) the intensity of the laser is different; or (iii) the speed of the scan is different. For example, FIG. 6A discloses a generally rectangular scan pattern that might be applied to a localized region of an optical grating. The scan pattern indicates the relative movement between the optical device and the $CO_2$ laser beam—preferably, the optical device is moved while the $CO_2$ laser is held stationary. In FIG. 6A, the intensity of the laser beam is held constant while the scan speed is varied. In FIG. 6B however, the scan speed is held constant while the scan intensity is varied. Finally, in FIG. 6C, both the scan speed and intensity are held constant while the scan pattern is shaped to provide a predetermined heat-treatment pattern. The specific speeds and intensities are matters of design choice and are selected, for example, to reduce strain-induced birefringence, change refractive index or increase transmission loss. It is understood that the size and shape of these patterns are merely illustrative of the present invention and that other patterns may be used to achieve different results. Advantageously, the use localized heat treatment, preferably using a $CO_2$ laser, enables one to modify one or more transmission characteristics within a time interval that is substantially less than known methods.

When the apparatus of FIG. 5 is used to modify birefringence, a probe beam that is composed of linearly polarized light with a wavelength of 1.5 microns is launched into one of the waveguides 15 prior to localized heating. The polarization of the probe beam is oriented at a 45 degree angle with respect to the principle refractive indices TE and TM of the waveguide. Although not shown in FIG. 5, the probe beam passes through a polarization compensator and an optical polarizer after emerging from the waveguide. These components allowed a complete analysis of the polarization state of the probe beam as it emerges from the waveguide. The waveguide is then heat treated through the cladding in accordance with the present invention. Illustratively, the pulsed $CO_2$ laser is operated at a duty cycle of about ten (10) percent to modify birefringence.

As indicated by the example above, the present invention selects an appropriate power density of the localized heating source at which to expose the waveguides. The main advantage of the technique of the present invention with respect to the UV irradiation technique is a much shorter duration of the modification process. Typically, with the UV irradiation method the time required for a convenient birefringence modification is in the order of hours (typically >8 hours) per device, while the process time for the method of the present invention is typically in the order of minutes (<10) per device. Another advantage is that the geometry of the localized thermal treatment can be changed via software by using a programmable positioner for the device, or for the source of heat, or for both, while a specific mask has to be fabricated for each device if the UV irradiation method is used.

When the apparatus of FIG. 5 is used to modify refractive index, a non-polarized probe beam having a wavelength of 1.5 microns is launched into one of the waveguides 15 prior to localized heating. Illustratively, the $CO_2$ laser 510 is operated at a duty cycle of about forty (40) percent to modify refractive index.

Finally, when the apparatus of FIG. 5 is used to modify transmission loss, a non-polarized probe beam having a wavelength of 1.5 microns is launched into one of the waveguides 15 prior to localized heating. Typically, heat treatment is applied to the input waveguides 15 and/or the output waveguides 16, rather than the grating waveguides when modifying transmission loss. Illustratively, the $CO_2$ laser 510 is operated at a duty cycle of about ninety (90) percent to modify transmission loss.

Although various particular embodiments of the present invention have been shown and described, modifications are possible within the scope of the invention. These modifications include, but are not limited to: the use of a heat source other than a $CO_2$ laser; the modification of transmission characteristics other than birefringence, refractive index or transmission loss; and the application of heat-treatment to optical devices other than the one disclosed herein.

We claim:

1. A method for reducing an inherent polarization shift caused by birefringence between the TE and TM modes of an optical signal propagating in an optical grating that includes a plurality of waveguides of unequal lengths, said waveguides comprising a core material surrounded by a cladding material, the method comprising the step of:

scanning predetermined lengths of the waveguides of the grating with a laser to induce localized softening of at least the cladding material in order to induce a polarization shift between the T E and TM modes that tends to compensate the inherent polarization shift.

2. The method of claim 1 further including the step:

selecting a scanning pattern that induces localized softening of its cladding material such that length of each waveguide whose cladding material is softened varies from waveguide to waveguide and is proportional to the length of the waveguide.

3. The method of claim 1 wherein the laser is a carbon dioxide ($CO_2$) laser.

4. An optical device, which is fabricated by a method that includes the steps:

depositing a plurality of layers of silica-based glass on a silicon substrate, wherein one or more waveguides are formed as light-transmitting paths of core material surrounded by cladding material;

directing the beam of a laser to a selected region of the optical device that intersects a portion of said waveguides, the beam having a power density that is at least sufficient to cause localized softening of the silica-based glass forming the waveguides, wherein a predetermined light-transmitting characteristic of the waveguides is modified.

5. The method of claim 4 wherein the predetermined transmission characteristic is optical transmission loss.

6. The method of claim 4 wherein the predetermined transmission characteristic is birefringence.

7. The method of claim 4 wherein the predetermined transmission characteristic is propagation delay.

* * * * *